United States Patent
Lazarevic et al.

(10) Patent No.: US 10,025,979 B2
(45) Date of Patent: Jul. 17, 2018

(54) PARAGRAPH PROPERTY DETECTION AND STYLE RECONSTRUCTION ENGINE

(75) Inventors: Milos Lazarevic, Belgrade (RS); Milos Raskovic, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 172 days.

(21) Appl. No.: 13/521,407

(22) PCT Filed: Jan. 23, 2012

(86) PCT No.: PCT/EP2012/000286
§ 371 (c)(1),
(2), (4) Date: Jul. 10, 2012

(87) PCT Pub. No.: WO2013/110286
PCT Pub. Date: Aug. 1, 2013

(65) Prior Publication Data
US 2013/0191389 A1    Jul. 25, 2013

(51) Int. Cl.
*G06F 17/30* (2006.01)
*G06K 9/00* (2006.01)

(52) U.S. Cl.
CPC ..... *G06K 9/00463* (2013.01); *G06K 9/00469* (2013.01)

(58) Field of Classification Search
CPC ............ G06F 17/2745; G06K 9/00469; G06K 9/00463; G06K 9/6828
See application file for complete search history.

(56) References Cited

U.S. PATENT DOCUMENTS

| | | | | |
|---|---|---|---|---|
| 4,813,010 A | * | 3/1989 | Okamoto et al. | 715/259 |
| 4,876,665 A | * | 10/1989 | Iwai et al. | |
| 5,033,008 A | * | 7/1991 | Barker et al. | 715/210 |
| 5,774,580 A | * | 6/1998 | Saitoh | 382/176 |
| 5,848,184 A | * | 12/1998 | Taylor et al. | 382/173 |
| 5,907,631 A | * | 5/1999 | Saitoh | 382/176 |
| 6,298,357 B1 | * | 10/2001 | Wexler et al. | 715/210 |
| 6,336,124 B1 | | 1/2002 | Alam et al. | |

(Continued)

FOREIGN PATENT DOCUMENTS

| | | | | |
|---|---|---|---|---|
| EP | 1107169 A2 | * | 6/2001 | G06K 9/20 |
| EP | 1679625 A2 | * | 7/2006 | |
| WO | WO 2007070010 A1 | * | 6/2007 | |

OTHER PUBLICATIONS

"Fast, Accurate PDF to Word Conversions", Retrieved on: Jan. 5, 2012, http://www.investintech.com/prod_a2d.htm, 3 pages.

(Continued)

*Primary Examiner* — Robert W Beausoliel, Jr.
*Assistant Examiner* — Jesse P Frumkin
(74) *Attorney, Agent, or Firm* — Merchant & Gould P.C.

(57) ABSTRACT

Embodiments of the present disclosure provide for analyzing paragraphs in a fixed format document to determine style clusters or groupings of each paragraph. In certain embodiments, the paragraphs are grouped into style clusters based on a first property. Each style cluster is then further divided into sub-groups based on a second property. Once the sub-groups have been determined, a third property associated with each paragraph in each sub-group is normalized based on a dominant one of the at least the third property.

24 Claims, 9 Drawing Sheets

(56) References Cited

U.S. PATENT DOCUMENTS

| | | | | |
|---|---|---|---|---|
| 6,496,600 | B1* | 12/2002 | Huang | G06K 9/6828 |
| | | | | 382/187 |
| 6,694,053 | B1* | 2/2004 | Burns | G06K 9/00469 |
| | | | | 382/176 |
| 6,760,887 | B1* | 7/2004 | Taieb | 715/269 |
| 7,370,274 | B1 | 5/2008 | Stuple et al. | |
| 7,555,711 | B2* | 6/2009 | Chao et al. | 715/246 |
| 7,603,351 | B2* | 10/2009 | Mansfield et al. | |
| 7,689,037 | B2* | 3/2010 | Handley et al. | 382/173 |
| 7,698,627 | B2* | 4/2010 | Asakawa et al. | 715/211 |
| 7,827,484 | B2 | 11/2010 | Dejean et al. | |
| 7,899,826 | B2* | 3/2011 | Mansfield et al. | 707/737 |
| 8,023,738 | B1* | 9/2011 | Goodwin | G06K 9/00469 |
| | | | | 382/175 |
| 8,208,726 | B2* | 6/2012 | Eshghi et al. | 382/177 |
| 8,249,344 | B2* | 8/2012 | Viola et al. | 382/173 |
| 8,260,049 | B2* | 9/2012 | Deryagin et al. | 382/173 |
| 8,261,186 | B2* | 9/2012 | Mansfield et al. | 715/234 |
| 8,311,330 | B2* | 11/2012 | Prabhakara et al. | 382/173 |
| 8,438,472 | B2* | 5/2013 | Mansfield et al. | 715/234 |
| 8,473,467 | B2* | 6/2013 | Levy et al. | 707/694 |
| 8,942,489 | B2* | 1/2015 | Sesum | G06K 9/00469 |
| | | | | 382/197 |
| 9,098,581 | B2 | 8/2015 | Yacoub et al. | |
| 9,330,070 | B2* | 5/2016 | Zaric | G06F 17/2223 |
| 2004/0194035 | A1* | 9/2004 | Chakraborty | G06F 17/2235 |
| | | | | 715/234 |
| 2004/0210818 | A1* | 10/2004 | Jones et al. | 715/500 |
| 2005/0114405 | A1 | 5/2005 | Lo | |
| 2006/0010375 | A1* | 1/2006 | Salesin et al. | 715/517 |
| 2006/0271847 | A1* | 11/2006 | Meunier | G06K 9/00469 |
| | | | | 715/205 |
| 2007/0074108 | A1* | 3/2007 | Xie | G06F 17/2229 |
| | | | | 715/234 |
| 2007/0116362 | A1* | 5/2007 | Tiede | G06K 9/00463 |
| | | | | 382/181 |
| 2007/0192687 | A1 | 8/2007 | Simard et al. | |
| 2007/0195095 | A1* | 8/2007 | Gerhard et al. | 345/467 |
| 2008/0107338 | A1* | 5/2008 | Furmaniak | G06K 9/00469 |
| | | | | 382/176 |
| 2009/0087094 | A1* | 4/2009 | Deryagin | G06K 9/00469 |
| | | | | 382/180 |
| 2009/0265339 | A1 | 10/2009 | Chen et al. | |
| 2009/0327285 | A1* | 12/2009 | Mansfield et al. | 707/5 |
| 2010/0174732 | A1* | 7/2010 | Levy et al. | 707/767 |
| 2010/0174980 | A1* | 7/2010 | Mansfield et al. | 715/234 |
| 2010/0306260 | A1* | 12/2010 | Dejean | G06F 17/2745 |
| | | | | 707/776 |
| 2011/0222773 | A1 | 9/2011 | Radakovic et al. | |
| 2012/0078612 | A1* | 3/2012 | Kandekar | G06F 17/2745 |
| | | | | 704/9 |
| 2012/0102388 | A1* | 4/2012 | Fan | 715/234 |
| 2012/0330944 | A1* | 12/2012 | Vailaya | G06F 17/30675 |
| | | | | 707/723 |
| 2013/0188875 | A1* | 7/2013 | Sesum | G06F 17/211 |
| | | | | 382/198 |
| 2013/0191366 | A1* | 7/2013 | Jovanovic | G06K 9/00469 |
| | | | | 707/710 |
| 2013/0191389 | A1* | 7/2013 | Lazarevic | G06K 9/00463 |
| | | | | 707/737 |
| 2013/0191715 | A1* | 7/2013 | Raskovic et al. | 715/227 |
| 2013/0191732 | A1* | 7/2013 | Lazarevic | G06K 9/00463 |
| | | | | 715/249 |
| 2013/0205200 | A1* | 8/2013 | Lazarevic | G06K 9/00463 |
| | | | | 715/244 |
| 2013/0205202 | A1* | 8/2013 | Xiao | G06F 17/2264 |
| | | | | 715/249 |
| 2014/0013215 | A1* | 1/2014 | Sesum | G06K 9/00463 |
| | | | | 715/247 |
| 2014/0250361 | A1* | 9/2014 | Wineman | G06F 17/2247 |
| | | | | 715/234 |
| 2014/0257789 | A1* | 9/2014 | Zaric | G06F 17/2223 |
| | | | | 704/8 |
| 2014/0258852 | A1* | 9/2014 | Sesum et al. | 715/256 |
| 2014/0301644 | A1* | 10/2014 | Koh | G06K 9/00469 |
| | | | | 382/175 |
| 2015/0121201 | A1* | 4/2015 | Sheldon | G06K 9/00469 |
| | | | | 715/249 |
| 2015/0135047 | A1* | 5/2015 | Sesum | G06F 17/211 |
| | | | | 715/202 |
| 2015/0149893 | A1* | 5/2015 | Lukic | G06F 17/2705 |
| | | | | 715/249 |
| 2016/0092404 | A1* | 3/2016 | Farouki | G06F 3/048 |
| | | | | 715/202 |
| 2016/0246774 | A1* | 8/2016 | Zaric | G06F 17/2223 |

OTHER PUBLICATIONS

"How to convert PDF to DOCX format?", Retrieved on: Jan. 4, 2012, http://www.avs4you.com/guides/convert-pdf-docx.aspx, 7 pages.

"How to Convert PDF to DOCX", Retrieved on: Jan. 4, 2012, http://www.pdfconverter.com/resources/pdftips/howtoconvertpdftodocx, 2 pages.

"PDF-to-Word", Retrieved on: Jan. 4, 2012, http://www.pdftoword.com/, 3 pages.

Chen, H. et al., "Integrating Geometrical and Linguistic Analysis for Email Signature Block Parsing," *ACM Transactions on Information Systems*, vol. 17, No. 4, pp. 343-366 (Oct. 1999).

International Search Report and Written Opinion for PCT/EP2012/000286 dated Apr. 17, 2013.

Kieninger, T. et al., "The T-Recs Table Recognition and Analysis System," *Lecture Notes in Computer Science/Computational Science*, vol. 1655, pp. 255-269 (1999).

Liang, J. et al., "Document Layout Structure Extraction Using Bounding Boxes of Different Entities," *Proceedings 3rd IEEE Workshop on Applications of Computer Vision*, pp. 278-283 (1996).

Zanibbi, R. et al., "A survey of table recognition Models, observations, transformations, and inferences," *International Journal on Document Analysis and Recognition*, vol. 7, pp. 1-16 (2004).

Zuyev, K., "Table Image Segmentation," *Proceedings of the 4th International Conference on Document Analysis and Recognition (ICDAR)*, vol. 2, pp. 705-708 (1997).

"Flow Document Overview", http://msdn.microsoft.com/en-us/library/aa970909.aspx, Mar. 15, 2012, 19 pages.

"Qt Reference Documentation", http://doc.qt.nokia.com/4.8-snapshot/qtextedit.html, Mar. 15, 2012, 27 pages.

Hassan, "PDF to HTML", http://www.dbai.tuwien.ac.at/staff/hassan/pdf2html/final.pdf, Mar. 15, 2012, 56 pages.

Hassan et al., "Table Recognition and Understanding from PDF Files", Document Analysis and Recognition, Ninth International Conference on IEEE, ICDAR, Sep. 23, 2007, pp. 1143-1147.

PCT International Preliminary Report on Patentability in PCT/EP2012/000286, dated Jul. 29, 2014, 8 pages.

Poirier et al., "An interactive system to extract structured text from geometrical representation", Proceedings of the 4th International Conference on Document Analysis and Recognition, ICDAR, Aug. 8, 1997, pp. 342-346.

Rus et al., "Using white space for automated document structuring technical report", http://ecommons.cornell.edu/bitstream/1813/6242/1/94-1542.pdf, Jan. 1, 1994, pages.

Sporleder, et al., "Broad Coverage Paragraph Segmentation across Languages and Domains", ACM Trans. Speech Lang. Process, 2006, 35 pages.

\* cited by examiner

390

391 — Pellentesque habitant morbi tristique senectus et netus et malesuada fames ac turpis egestas. Proin pharetra nonummy pede. Mauris et orci.

Right Indent

392 — Pellentesque habitant morbi tristique senectus et netus et malesuada fames ac turpis egestas. Proin pharetra nonummy pede. Mauris et orci.

PARAGRAPH PROPERTY DETECTION AND STYLE RECONSTRUCTION ENGINE

CROSS-REFERENCE TO RELATED APPLICATIONS

This application is a National Stage of International Application No. PCT/EP2012/000286, filed Jan. 23, 2012, and entitled, "PARAGRAPH PROPERTY DETECTION AND STYLE RECONSTRUCTION ENGINE".

BACKGROUND

Flow format documents and fixed format documents are widely used and have different purposes. Flow format documents organize a document using complex logical formatting structures such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as pages, text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document must be converted into a flow format document. Conversion involves parsing the fixed format document and transforming the basic physical layout elements into the more complex logical elements used in a flow format document. Existing document converters faced with complex elements, such as mathematical formulas and expressions, often resort to base techniques designed to preserve visual fidelity of the layout of the fixed format document (e.g., text frames, line spacing, character spacing, and images) at the expense of the flowability of the output document. The result is a limited flow format document that requires the user to perform substantial manual reconstruction to have a truly useful flow format document.

It is with respect to these and other considerations that the present embodiments have been made. Although relatively specific problems have been discussed, it should be understood that the embodiments disclosed herein should not be limited to solving the specific problems identified in the background.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments described in the present disclosure provide for analyzing paragraphs in a fixed format document in order to classify each of the paragraphs into one or more groups based on one or more style properties of each paragraph. Once each paragraph has been classified into various groups based on the one or more styles, each paragraph, and its associated style, is mapped to a flow format document. In certain embodiments, the paragraphs contained in the fixed format document are analyzed to determine all properties (e.g., both paragraph properties and character properties) associated with each paragraph. Dominant properties associated with each paragraph are then determined and grouped into a data structure. In certain embodiments, each paragraph that shares the same or similar first property (e.g., a discrete property) is grouped into style clusters. In certain embodiments, the first property may be the dominant property discussed above. When the paragraphs have been grouped, each group is sub-divided based on a second property associated with each paragraph. In certain embodiments, the second property is different from the first property. Once the sub-groups have been determined, a third property associated with each of the paragraphs is normalized based on a dominant value associated with at least one of the third properties. As will be discussed in greater detail below, each style cluster is analyzed to determine which style cluster can be marked as one of a commonly used document style such as "Heading" or "Normal" style.

Embodiments disclosed herein may be implemented as a computer process, a computing system or as an article of manufacture such as a computer program product or computer readable media. The computer program product may be computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

FIG. 3B illustrates an exemplary paragraph having a continuous property having continuous values according to one or more embodiments;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
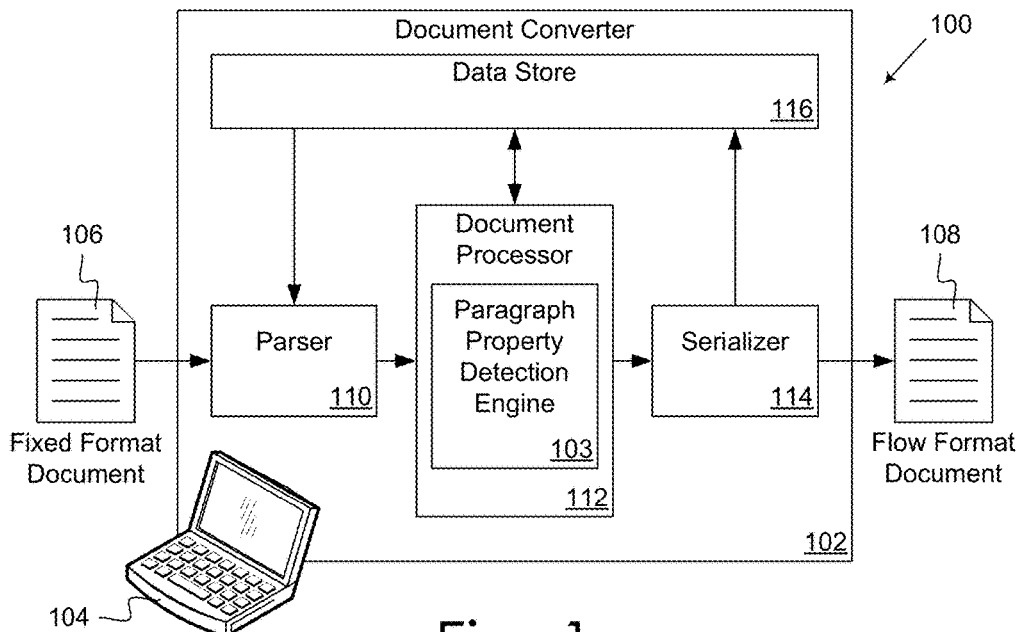
FIG. 1 illustrates a system for analyzing text from a fixed format document to determine one or more properties of each paragraph contained in the fixed format document according to one or more embodiments.

FIG. 1 illustrates one embodiment of a system 100 including a paragraph property detection engine 103 for analyzing text from a fixed format document to determine one or more properties of each paragraph contained in the fixed format document. As shown in FIG. 1, the system 100 includes a document converter 102 executing on a computing device 104. In certain embodiments, the computing device 104 may be a personal computer, a laptop computer, a tablet computer, a mobile phone and the like. The document converter 102 receives a fixed format document 106 as input, processes the fixed format document in order to identify paragraphs contained in the document, and analyzes the paragraphs to determine various properties of each of the paragraphs. In certain embodiments, the properties that are identified, and on which the analysis (described below) is done, may include both character properties and paragraph properties.

Non-limiting examples of character properties include font typeset, font color, font size, font effects (e.g., underline, strikethrough, bold, italic, etc.), and character shading. Likewise, non-limiting examples of paragraph properties include paragraph alignment (e.g., left, right, center, and justified), line indentation (e.g., left, right, first line, and hanging), line spacing (e.g., spacing between lines in a paragraph), paragraph spacing (spacing between successive paragraphs), paragraph borders, and paragraph shading. Additionally, each character property and paragraph property may be divided based on those properties that have discrete values and those properties that have continuous values.

Exemplary properties that have discrete values include the various font effects described above (e.g., bold, italic, underline, etc.), paragraph border, alignment etc., since possible values for each of those properties are from a predetermined set of values. On the other hand, properties that have continuous values are usually described with a float number. Exemplary properties that have continuous values include font size, indentation, line spacing, and the like. In addition, and as will be described below, in certain embodiments, continuous values may not always be precisely defined as there may be calculation errors present. As such, continuous properties are initially represented as an interval, and may later be normalized to have a single value.

Identifying various character properties and paragraph properties associated with each paragraph in the fixed format document 106 enables each paragraph to be mapped to a flow format document 108 such that the various styles and properties associated with each paragraph of the fixed format document 106 may be reconstructed in the flow format document 108. As a result, the format and layout of the flow format document 108 will closely resemble the fixed format document 106. Therefore, when the flow format document 108 is subsequently edited, the edits will be automatically formatted (e.g., have the same character properties and/or paragraph properties) according to the surrounding text or content that was converted from the fixed format document 106.

In certain embodiments, the system 100 also includes a parser 110, a document processor 112, and a serializer 114. The parser 110 extracts data from the fixed format document 106. The data extracted from the fixed format document is written to a data store 116 accessible by the document processor 112 and the serializer 114. The document processor 112 analyzes and transforms the standardized data into flowable elements using one or more detection and/or reconstruction engines (e.g., the paragraph property detection engine 103 of the present disclosure). Finally, the serializer 114 writes the flowable elements into a flow format document 108 such as a word processing document. Although a word processing document is specifically mentioned, it is contemplated that that a flow format document 108 may also be a spreadsheet document, a presentation program document (e.g., MICROSOFT POWERPOINT by Microsoft Corporation of Redmond, Wash.), and the like.

Figure 2:
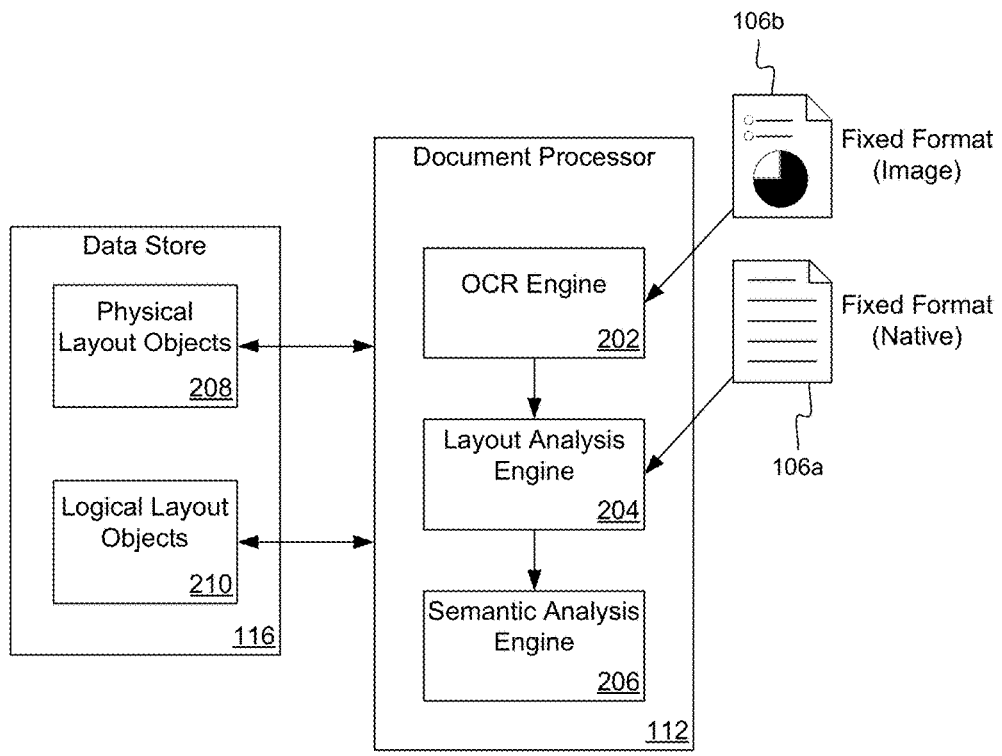
FIG. 2 is a block diagram showing the operation flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, and a section is the top level group for the logical layout objects 210. The data extracted from the fixed format document 106 is generally stored as physical layout objects 208 organized by the containing page in the fixed format document 106. The basic physical layout objects obtained from a fixed format document include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics.

Where processing begins depends on the type of fixed format document 106 being parsed. A native fixed format document 106a created directly from a flow format source document contains the some or all of the basic physical layout elements. Generally, the data extracted from a native fixed format document 106a is available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 determines the layout of the fixed format document and enriches the data store with new information (e.g., adds, removes, and updates the physical layout objects). After layout analysis is complete, the semantic analysis engine 206 enriches the data store with semantic information obtained from analysis of the physical layout objects and/or logical layout objects.

Figure 3A:
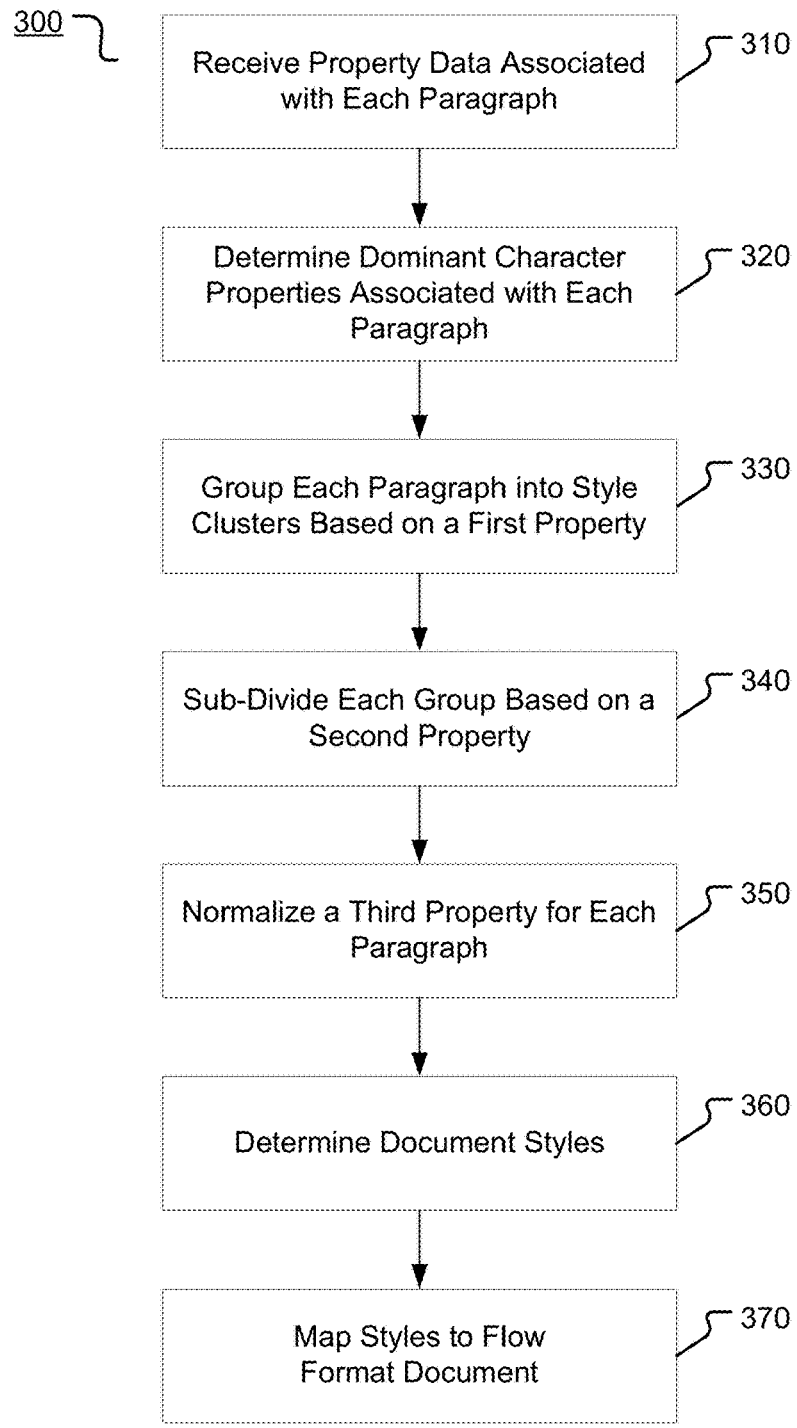
FIG. 3A illustrates a method for grouping paragraphs based one or more properties associated with each paragraph contained in the fixed format document according to one or more embodiments.

FIG. 3A illustrates a method 300 for grouping paragraphs based on one or more properties associated with each paragraph contained in the fixed format document according to one or more embodiments. In certain embodiments, one or more components of a system, such as system 100 (FIG. 1), may employ the method 300 to analyze paragraph properties and group the paragraphs based on the determined properties of each paragraph.

Method 300 begins at operation 310 in which property data associated with each paragraph from a fixed format document is received. In certain embodiments, the property data is provided by a layout analysis engine (not shown) which determines the paragraph and character properties of the fixed format document. For example, as briefly discussed above, a parser, such as parser 110 (FIG. 1), reads and parses the fixed format document into parsed elements. A document processor, such as document processor 112 (FIG. 1), utilizes a layout analysis engine to analyze and categorize the paragraph and character properties. The parsed elements are then converted into flowable elements using one or more formatting engines. In certain embodiments, some of the flowable elements include the paragraphs of the fixed format document. During processing of the fixed format document, one or more properties for each paragraph and/or character in each paragraph is determined and stored in a storage device. As discussed above, these properties may include character properties, paragraph properties, or a combination thereof.

Once the various properties of paragraphs of the fixed format document have been received, flow proceeds to operation 320 in which all of the properties are grouped into a single comparable structure and a dominant character properties associated with each paragraph are determined. In certain embodiments, the various style clusters into which the paragraphs will be grouped are created based on the determined dominant character properties.

In an embodiment, a character property may have an associated discrete value. However, it is contemplated that one or more paragraphs may have multiple properties, with each property having an associated discrete value. For example, a paragraph may have a character property (e.g., font type) and a paragraph property (e.g., paragraph shading) with each property having an associated discrete value. It is also contemplated that a particular paragraph may have multiple character properties or multiple paragraph properties, each having a discrete value. For example, a particular paragraph may have some characters that are italicized while other characters are not italicized. In order to determine the style of such paragraphs, the dominant property is determined and the paragraph style is based on the dominant property as will be described in detail below.

Flow then proceeds to operation 330 in which each paragraph is grouped into a style cluster based on a first property. For example, if the fixed format document contained three paragraphs and two of the paragraphs have a first property with the same or similar discrete value (e.g., no paragraph shading), a group having that property trait is created (if it does not already exist), and those two paragraphs are placed in that group or style cluster. Likewise, the third paragraph is placed in a separate group or style cluster that is associated with the property or properties of the third paragraph.

Continuing with the example above, the third paragraph may have a character property (e.g., a font effect) and a paragraph property (e.g. paragraph shading). Because the third paragraph includes both properties, at least one of which is different from the paragraph property of the first two paragraphs, the third paragraph is placed in a second style cluster. In this example, the style cluster may be defined based both the character property and paragraph property.

As was also discussed above, a paragraph may have multiple properties (e.g., one alignment, indentation, and paragraph shading). In such cases, the multiple properties are combined to create a single first property. Thus, in order for paragraphs with multiple properties to be placed in the same cluster, each of the paragraphs may be required to have the same or similar properties (e.g., the same alignment, indentation, and paragraph shading). It is also contemplated that the same paragraph may include multiple character properties having discrete values (e.g., a paragraph having text with both italicized and non-italicized font). In such situations, a determination is made as to which character property is the most dominant property, and the paragraph is placed in a style cluster associated with the most dominant character property.

In certain embodiments, a particular property may be classified as the dominant property only if the particular character property exceeds a threshold. For example, if a particular paragraph contains characters that are italicized and characters that are not italicized, in order for non-italicized characters to be classified as the dominant property, the total number of non-italicized characters may be required to exceed a threshold value (e.g., at least 71% of the characters in the paragraph must be non-italicized).

Once the paragraphs of the fixed format document are grouped into the various style clusters by the first property, flow proceeds to operation 340 in which each style cluster is sub-divided based on the second property. For example, in an embodiment where the second property is the alignment of the paragraph, each paragraph with the same or similar alignment (e.g., left alignment, right alignment, center alignment, etc.) is grouped together in the same sub-group.

It is contemplated that some paragraphs in a fixed format document may have a large number of lines (e.g., 10 lines) while some paragraphs have a few lines (e.g., one or two lines). In certain embodiments, in order to group paragraphs into various style clusters, a paragraph may be required to have a minimum number of lines (e.g., three or more). If a particular paragraph does not meet the minimum threshold line requirement, that particular paragraph may be grouped into a style cluster and/or sub-group of a particular style cluster based on which style cluster and/or sub-group of a particular style cluster has the most dominant property.

For example, consider a particular fixed format document that includes 20 paragraphs, 19 of which exceed the minimum line threshold requirement. Of the 19 paragraphs, 15 paragraphs are left justified and four paragraphs are right justified. When the style clusters are sub-divided into the groups, all paragraphs that have ambiguous values (e.g., those paragraphs that only have one or two lines in the alignment scenario above) are filtered out. Once the filtering is complete, the paragraphs are sub-divided based on the second property. Once the sub-groups are determined (e.g., in this example the sub-groups include left justification and right justification), a determination is made as to where the ambiguous paragraph should be grouped. In the above example, the ambiguous paragraph is placed in the left justification sub-group because the left justification sub-group includes more paragraphs (e.g., the left justification sub-group is the most dominant sub-group). Although the above example has been illustrated with respect to the second property, it is contemplated that the above determination, with respect to paragraphs that do not meet the minimum threshold line requirement, may be made based on the first property. Accordingly, the paragraphs that do not meet the minimum threshold line requirement may be grouped into style clusters (e.g. operation 330) having the most dominant first property.

Once each style cluster has been sub-divided, flow proceeds to operation 350 in which a third property associated with each paragraph is normalized. In certain embodiments, the third property of each paragraph includes those properties that have associated continuous values. As discussed above, continuous values include values that can take a number from an interval of values.

For example, referring to FIG. 3B which illustrates a sample paragraph 390 of a fixed format document. In this example, FIG. 3B illustrates two iterations 391 and 392 of the sample paragraph 390, each of which are left aligned. Considering the first iteration 391, if the right indentation is calculated based only on the visual appearance of the first iteration 391, a single value for the right indentation will be found only with respect to line 393. However, if the logical meaning of each word and the line breakage in word processors is considered, all values between lines 393 and 394 receive the same visual representation of the paragraph since the line breaks are dependent on the length of the words.

In certain embodiments, the first line 393 is calculated by determining the line that includes the farthest rightmost word. In the sample paragraph 390, the line containing the farthest rightmost word is line two. To determine the placement of the second line 394, each line is extended using the first word from the next line (e.g., the lighter words in the second iteration 392 of the sample paragraph 390). The second line 394 is calculated as a minimum right edge of hose newly created lines.

As discussed above, as there may be multiple continuous values for each paragraph, operation 350 provides the third property is normalized. In certain embodiments, the third property is normalized on a per-cluster basis. For example, a first dominant interval (e.g., the interval that intersects the most paragraphs) for each cluster is determined. Once the dominant interval is determined, all paragraphs in that cluster that have a continuous value within a certain threshold of the determined dominant interval are updated with that dominant value.

For example, a particular style cluster includes four paragraphs that have the following values for right indentation: (1.5, 2.0); (1.8, 2.0); (1.3, 1.9); and (1.85, 2.3). In this example, the interval that contains the most paragraphs is (1.85, 1.9). Although specific intervals have been given, it is contemplated that in some embodiments, the normalization of the third property may occur only when the continuous values of the paragraphs in each cluster meet or exceed a certain threshold. In certain embodiments, if the threshold is not met, the continuous value associated with each third property may be normalized to zero.

Once the third property for each paragraph has been normalized, flow proceeds to operation 360 in which each of the clusters are analyzed to determine which clusters are to be marked and used as document styles. In certain embodiments, the document style may be selected from a "Normal" style or "Heading" style. A "Normal" style is assigned to the most frequent paragraph style. In certain embodiments, the most frequent paragraph style is determined based on the style cluster or group of paragraphs that contain the most characters. On the other hand, a "Heading" style refers to paragraphs that are meant to be headings of a particular paragraph or group of paragraph. Examples include, but are not limited to the "Background", "Summary" or Detailed Description" headings contained in the present document. Other exemplary headings of documents may include titles of documents or portions of documents that are numbered using an outline format to indicate different portions of the document.

In certain embodiments, the definition of the primary paragraph style is based on the total length of the document. For example, in order to qualify as the primary paragraph style of a short document (e.g., a one page document), a larger percentage of the paragraphs of the document (e.g., 80%) may need to have a similar style cluster or grouping. Additionally, for large documents (e.g., a twenty page document) a smaller percentage of the paragraphs of the document (e.g., 60%) may need to have a similar style cluster or grouping.

Once the document styles of have been determined, flow proceeds to operation 370 in which the style of each paragraph is mapped to a flow format document, such as, for example, flow format document 108 (FIG. 1). As discussed above, the flow format document may be a word processing document, spreadsheet document, a presentation document and the like. The process of mapping the style of each paragraph to the flow format document enables reconstruction of the various properties associated with each paragraph such that when edits are made to various paragraphs of the flow format document, the edits have the same characteristics and formatting as the surrounding text or characters imported from the fixed format document.

Figure 4:
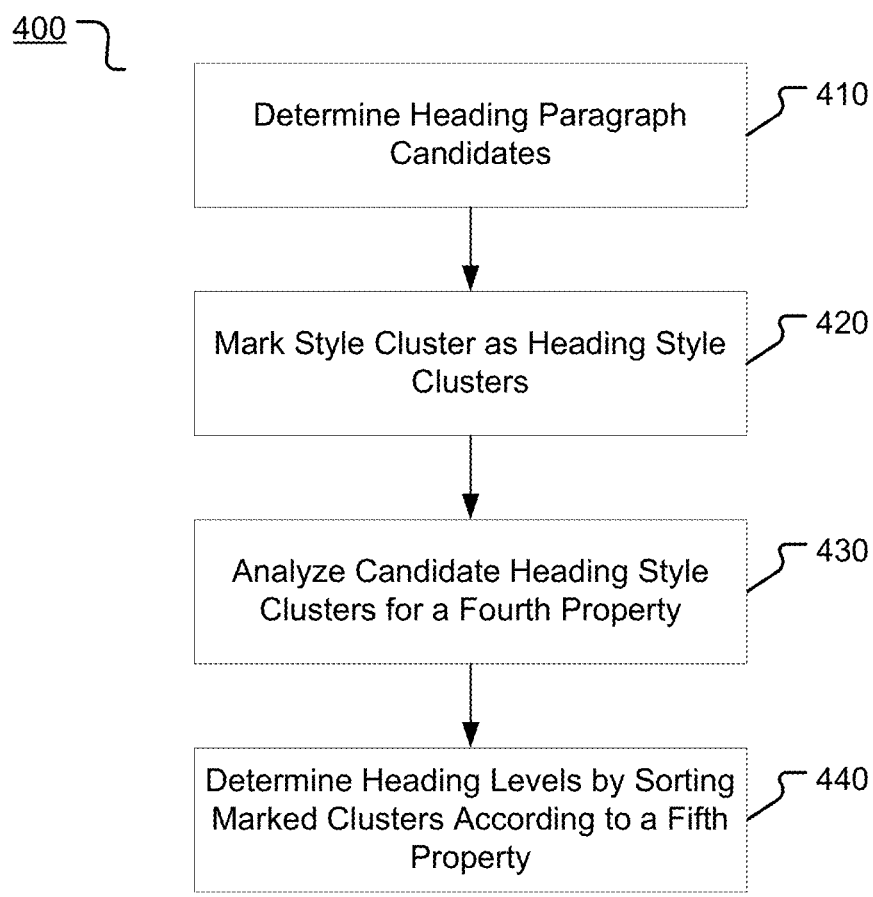
FIG. 4 illustrates a method for analyzing style clusters to determined heading styles according to one or more embodiments.

FIG. 4 illustrates a method 400 for determining a document style for each of the paragraphs of the fixed format document according to one or more embodiments. As discussed above with respect to FIG. 3A, operation 360 provides that document styles are defined. Accordingly, method 400 may be included in operation 360.

Method 400 begins at operation 410 in which candidate heading paragraphs are determined. In certain embodiments, all paragraphs in each style cluster, including all paragraphs that are classified as "Normal", are analyzed to determine which paragraphs are candidate heading paragraphs. In another embodiment, only those paragraphs that were not previously classified as "Normal" style are analyzed to determine which paragraphs are candidate heading paragraphs.

In order to make the determination as to whether a particular paragraph is a candidate heading paragraph, one or more features associated with each paragraph are run through a decision tree. In certain embodiments, the decision tree analyzes each of the features to determine whether particular paragraphs are candidate heading paragraphs. These features may include whether a particular paragraph has outline numbers or whether the particular paragraph has a specific line indentation. Other examples include whether the specific paragraph has particular font effects. Although specific examples have been given, it is contemplated that any number of paragraph features may be used to determine which paragraphs are candidate heading paragraphs.

Once the list of candidate heading paragraphs is determined, flow proceeds to operation 420 in which each style cluster is analyzed to determine whether a particular style cluster should be marked as a heading style cluster. If the number of paragraphs in a particular cluster classified as heading style clusters exceeds a threshold, the particular cluster is marked as a heading style cluster. If however, the number of paragraphs in the cluster does not exceed the threshold, the candidate heading paragraphs are discarded as candidate heading paragraphs. In another embodiment, if the candidate heading paragraphs are substantially equally divided between belonging to various style clusters, the candidate heading paragraphs are split into separate groups with one group containing the candidate heading paragraphs that belong to a particular style cluster and the other group containing paragraphs that are not classified as candidate heading paragraphs. The paragraphs that are no longer classified as candidate heading paragraphs are then discarded as candidate heading paragraphs.

Flow then proceeds to operation 430 in which each candidate heading style cluster is analyzed for a fourth property. In certain embodiments, the fourth property is an outline number. In such embodiments, the fourth property is associated with an outline number because outline numbers are often assigned to heading paragraphs. Additionally, outline numbers also reflect a heading level of the heading paragraph, as part of operation 430, common outline or numbering scheme and level for each of the style clusters are determined. In situations where a candidate heading style cluster has multiple different outline numbering (e.g., a first candidate paragraph heading is numbered using an "I" and a second candidate heading paragraph is numbered using an "A"), the candidate heading style cluster may be further sub-divided into different groups or clusters based on the detected outline numbering system.

Once the fourth property for each candidate heading style cluster is analyzed, the candidate heading style cluster are analyzed 440 for a fifth property. In certain embodiments, the fifth property determines a level of each candidate heading paragraph in each of the candidate heading style clusters. In certain embodiments, the fifth property may include: (i) a font size, (ii) font effects, (iii) outline numbering, and the like. The level of the heading style determines whether the heading style is a child, or sub-heading paragraph. For example, if a certain heading style cluster has a larger font size as compared to another group or heading style cluster, the heading style cluster with the larger font size may indicate that the first group or heading style cluster of candidate heading paragraphs has a higher level. Although font size is specifically mentioned, it is contemplated that other features or properties may also be considered such as, for example font effects, outline numbering, etc.

While the various embodiments have been described in the general context of program modules that execute in conjunction with an application program that runs on an operating system on a computer, those skilled in the art will recognize that the embodiments disclosed herein may also be implemented in combination with other program modules. Generally, program modules include routines, programs, components, data structures, and other types of structures that perform particular tasks or implement particular abstract data types.

Figure 5:
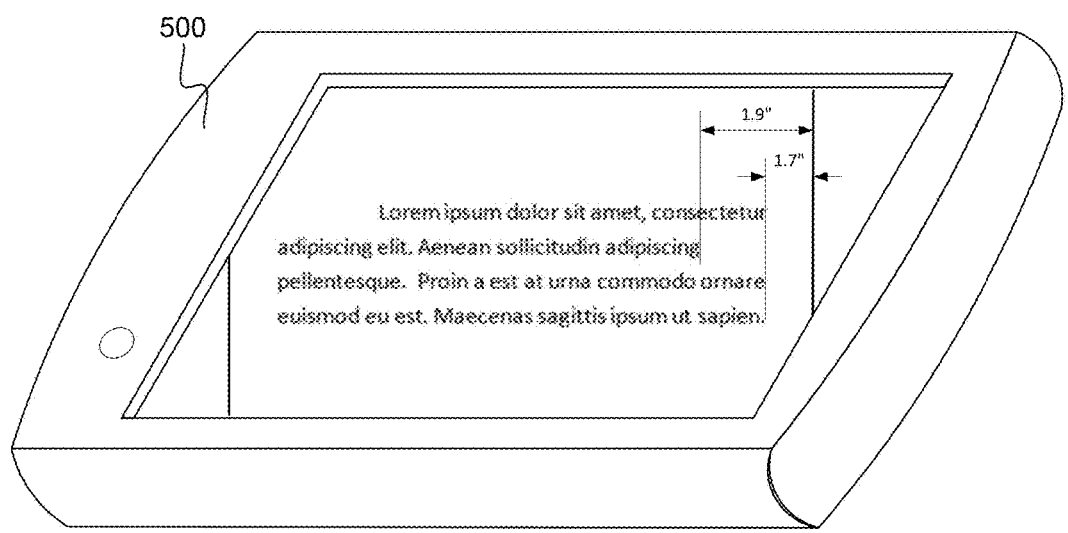
FIG. 5 illustrates a tablet computing device executing one embodiment of the paragraph property detection engine.
Figure 6:
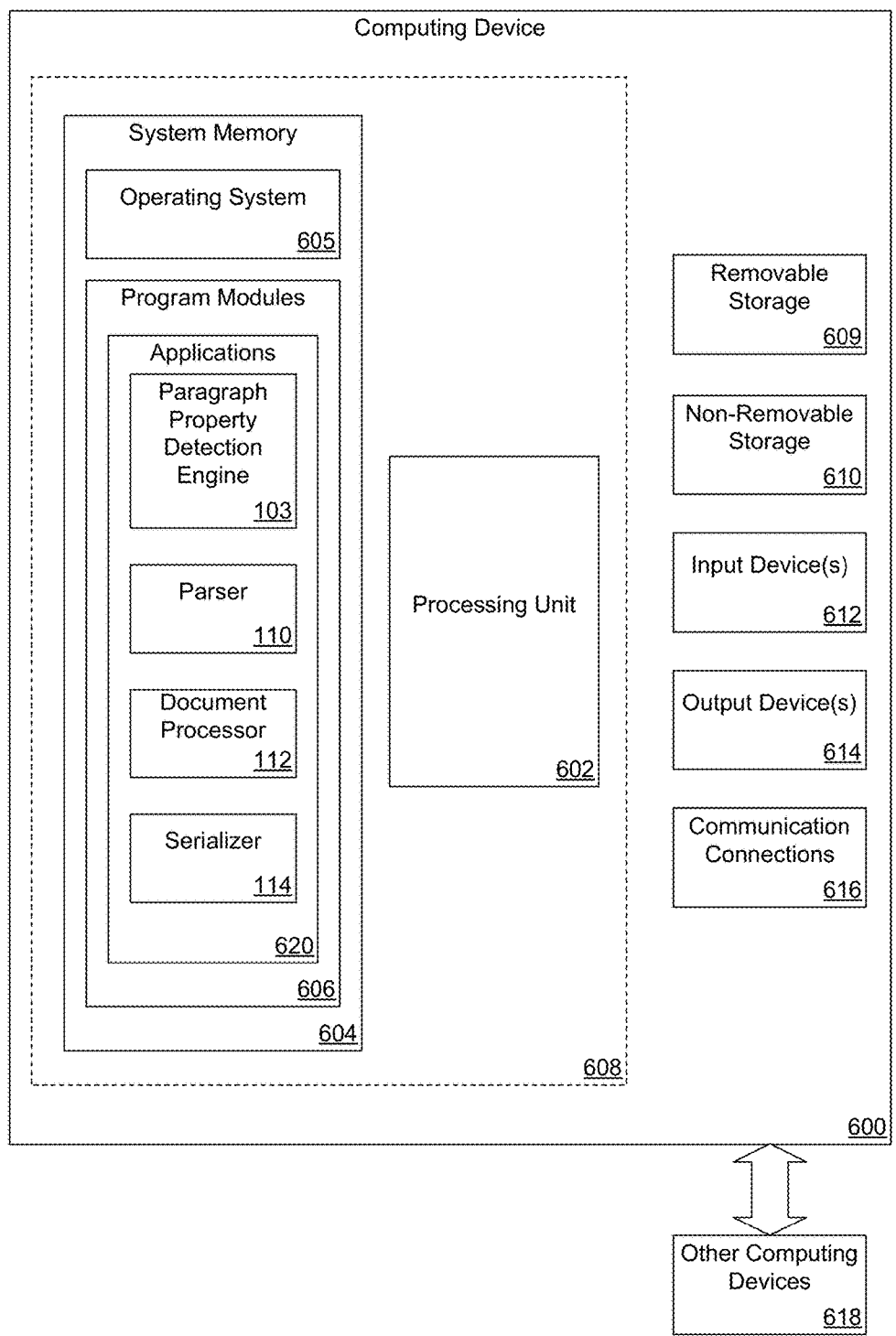
FIG. 6 illustrates a block diagram of a computing environment suitable for implementing one or more embodiments disclosed herein.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 5 illustrates an exemplary tablet computing device 500 executing an embodiment of the paragraph property detection engine 103. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 6 through 8 and the associated descriptions provide a discussion of a variety of operating environments in which embodiments of the present disclosure may be practiced. However, the devices and systems illustrated and discussed with respect to FIGS. 6 through 8 are for purposes of example and illustration and are not limiting of a vast number of computing device configurations that may be utilized for practicing embodiments of the present disclosure, described herein.

FIG. 6 is a block diagram illustrating exemplary physical components (i.e., hardware) of a computing device 600 with which embodiments of the present disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620, such as the paragraph property detection engine 103, the parser 110, the document processor 112, and the serializer 114. The operating system 605, for example, may be suitable for controlling the operation of the computing device 600. Furthermore, embodiments of the present disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606, such as the paragraph property detection engine 103, the parser 110, the document processor 112, and the serializer 114 may perform processes including, for example, one or more of the stages of the methods described herein. The aforementioned process is an example, and the processing unit 602 may perform other processes. Other program modules that may be used in accordance with embodiments of the present disclosure may include electronic mail and contacts applications, word processing applications, spreadsheet applications, database applications, slide presentation applications, drawing or computer-aided application programs, etc.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the paragraph property detection engine 103, the parser 110, the document processor 112, and the serializer 114 may be operated via application-specific logic integrated with other components of the computing device 600 on the single integrated circuit (chip). Embodiments of the present disclosure may also be practiced using other technologies capable of performing logical operations such as, for example, AND, OR, and NOT, including but not limited to mechanical, optical, fluidic, and quantum technologies. In addition, embodiments of the present disclosure may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, or serial ports, and other connections appropriate for use with the applicable computer readable media.

Embodiments of the present disclosure, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 604, the removable storage device 609, and the non-removable storage device 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 600. Any such computer storage media may be part of the computing device 600.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
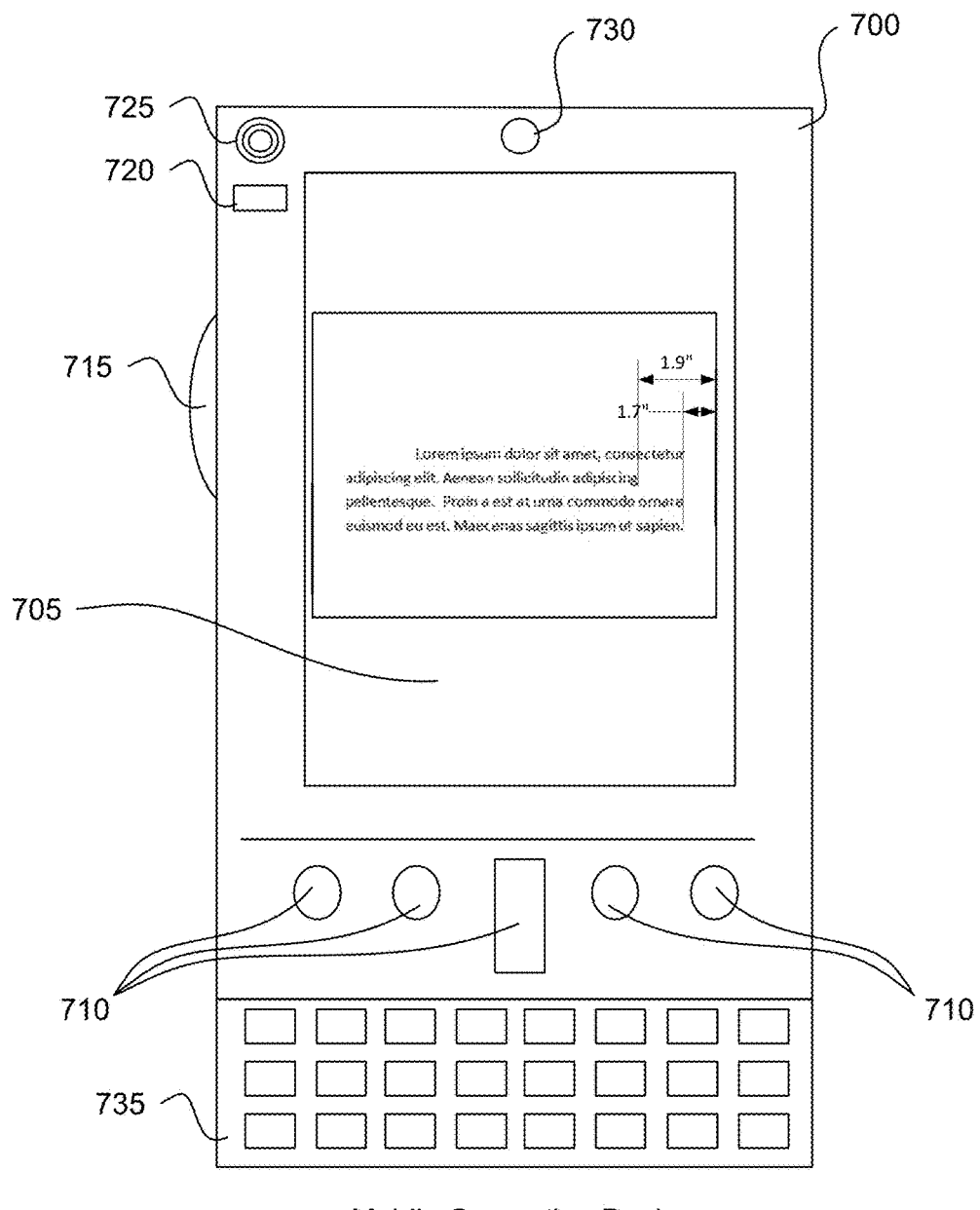
FIG. 7A illustrates one embodiment of a mobile computing device executing one or more embodiments disclosed herein.
Figure 7B:
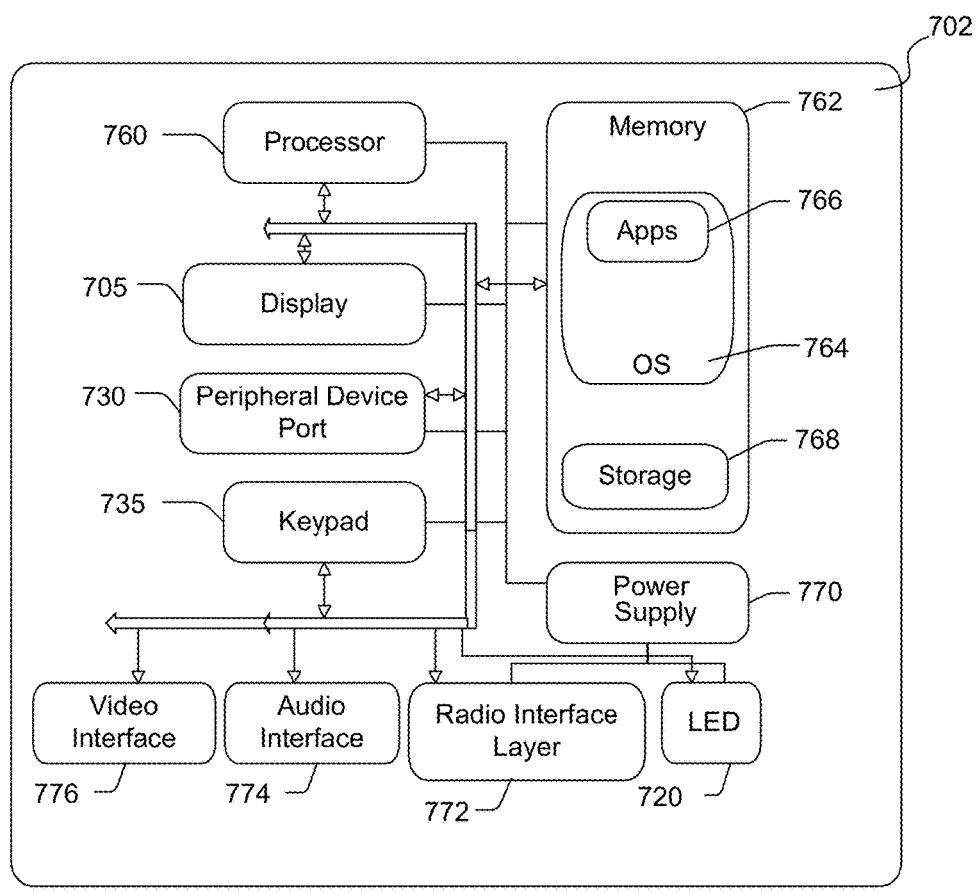
FIG. 7B is a simplified block diagram of an exemplary mobile computing device suitable for practicing one or more embodiments disclosed herein.
Figure 8:
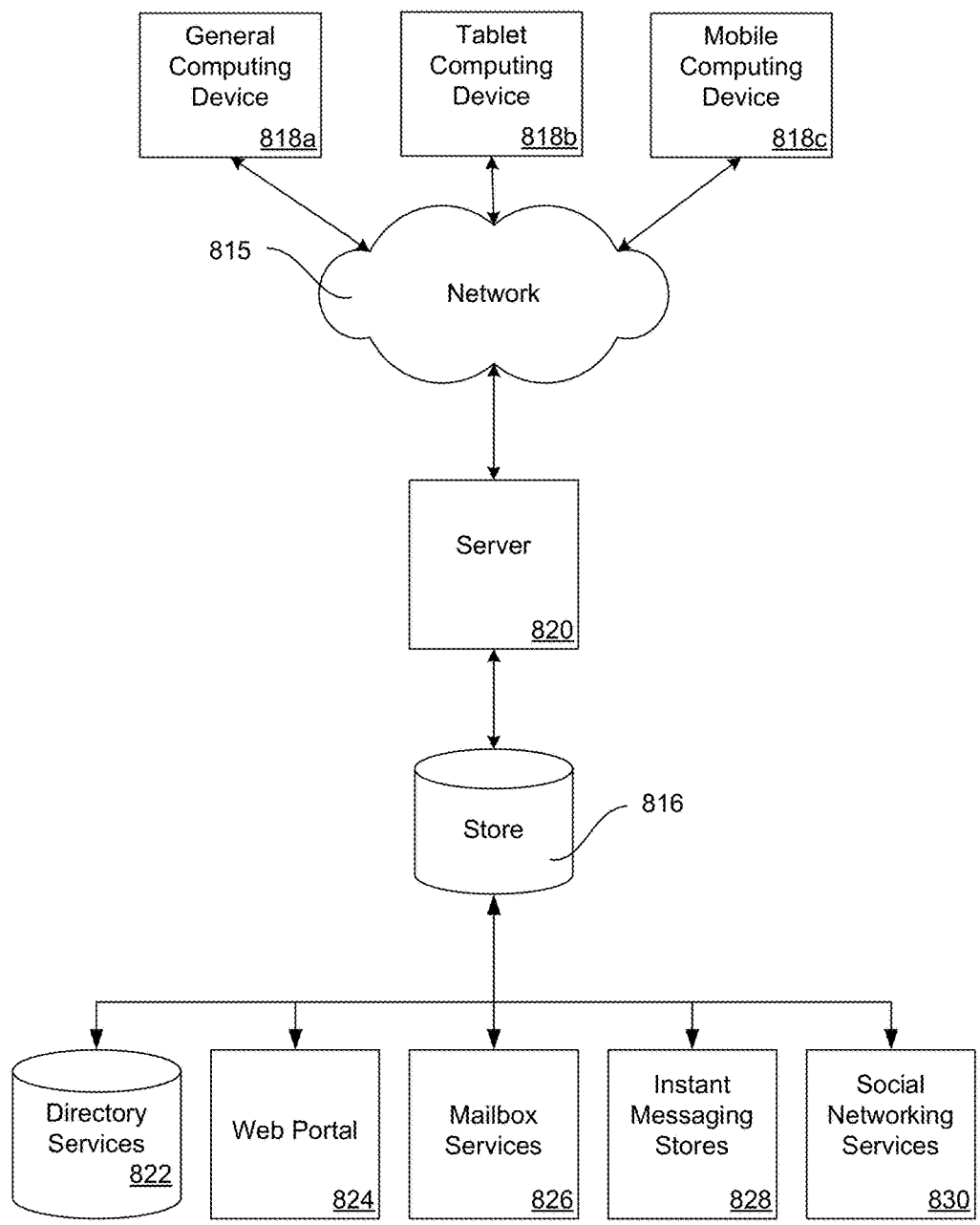
FIG. 8 is a simplified block diagram of an exemplary distributed computing system suitable for practicing one or more embodiments disclosed herein.

FIGS. 7A and 7B illustrate a mobile computing device 700, for example, a mobile telephone, a smart phone, a tablet personal computer, a laptop computer, and the like, with which embodiments of the present disclosure may be practiced. With reference to FIG. 7A, an exemplary mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including paragraph property detection engine 103, the parser 110, the document processor 112, and the serializer 114 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world", via a communications carrier or service provider. Transmissions to and from the radio 772 are conducted under control of the operating system 764. In other words, communications received by the radio 772 may be disseminated to the application programs 766 via the operating system 764, and vice versa.

The radio 772 allows the system 702 to communicate with other computing devices, such as over a network. The radio 772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 702 provides notifications using the visual indicator 720 that can be used to provide visual notifications and/or an audio interface 774 producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768. Computer storage media may include volatile and nonvolatile, removable and non-removable media implemented in any method or technology for storage of information, such as computer readable instructions, data structures, program modules, or other data.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system for providing the paragraph property detection engine 103, the parser 110, the document processor 112, and the serializer 114 to one or more client devices, as described above. Content developed, interacted with or edited in association with the paragraph property detection engine 103, the parser 110, the document processor 112, and the serializer 114 may be stored in different communication channels or other storage types. For example, various documents may be stored using a directory service 822, a web portal 824, a mailbox service 826, an instant messaging store 828, or a social networking site 830. The paragraph property detection engine 103, the parser 110, the document processor 112, and the serializer 114 may use any of these types of systems or the like for enabling data utilization, as described herein. A server 820 may provide the paragraph property detection engine 103, the parser 110, the document processor 112, and the serializer 114 to clients. As one example, the server 820 may be a web server providing the paragraph property detection engine 103, the parser 110, the document processor 112, and the serializer 114 over the web. The server 820 may provide paragraph property detection engine 103, the parser 110, the document processor 112, and the serializer 114 over the web to clients through a network 815. By way of example, the client computing device 818 may be implemented as the computing device 800 and embodied in a personal computer 818a, a tablet computing device 818b and/or a mobile computing device 818c (e.g., a smart phone). Any of these embodiments of the client computing device 818 may obtain content from the store 816. In various embodiments, the types of networks used for communication between the computing devices that make up the present disclosure include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network. In one embodiment, the client network is part of the enterprise network. In another embodiment, the client network is a separate network accessing the enterprise network through externally available entry points, such as a gateway, a remote access protocol, or a public or private internet address.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the claims in any way. The embodiments, examples, and details provided in this application are considered sufficient to convey possession and enable others to make and use the best mode of the claimed subject matter. The claimed subject matter should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claims.

What is claimed is:

1. A method for converting a fixed format document containing text runs with common formatting into a flow format document, the method comprising the acts of:
analyzing a fixed format document to determine a plurality of properties associated with a plurality of paragraphs contained in the fixed format document, wherein the determined plurality of properties include a paragraph property and a character property;
associating each paragraph property and each character property with a discrete value or with a continuous value, wherein the discrete value comprises a numerical value and the continuous value comprises a numerical interval;
determining a dominant character property for each of the plurality of paragraphs based on a most commonly occurring character property discrete value within the respective paragraph;
grouping each of the plurality of paragraphs into clusters according to a common dominant character property;
dividing each cluster of paragraphs into a plurality of sub-clusters of paragraphs, wherein each sub-cluster of paragraphs has a common paragraph property discrete value or a common character property discrete value that is different from the common dominant character property discrete value;
for the paragraphs in each of the plurality of sub-clusters, determining that the paragraphs have a common paragraph property or a common character property associated with a plurality of different intervals of continuous values, and normalizing those plurality of different intervals to a single numerical value;
associating the single numerical value with the common paragraph property or common character property previously associated with the continuous value;
determining a style for each paragraph of the document based on: (a) the dominant common character property discrete value; (b) the common paragraph property discrete value or the common character property discrete value that is different from the dominant common character property discrete value; and (c) the normalized single numerical value of the common paragraph property or common character property that was previously associated with the continuous value; and
mapping each paragraph to a flow format document with its determined style.

2. The method of claim 1, wherein determining a dominant character property for each of the plurality of paragraphs based on a most commonly occurring character property discrete value within the respective paragraph includes determining a percentage of common discrete values associated with a common character property associated with each respective paragraph exceeding a predetermined threshold value.

3. The method of claim 1, wherein the paragraph property comprises a paragraph alignment property, a line indentation property, a line spacing property, a paragraph spacing property, paragraph border property or a paragraph shading property.

4. The method of claim 1, wherein the character property comprises a font typeset property, a font color property, a font size property, a font effect property, or a character shading property.

5. The method of claim 4, wherein the font effect property comprises an underline, strikethrough, bold, or italic property.

6. The method of claim 4, wherein the style comprises a Heading style or a Normal style.

7. The method of claim 6, wherein the Normal style comprises the most frequently occurring paragraph style.

8. The method of claim 7, wherein the most frequently occurring paragraph style is determined based on the greatest number of characters associated with a specific paragraph style.

9. A system for converting a fixed format document containing text elements into a flow format document, the system comprising:
a document processing unit; and
a memory containing computer executable constructions which, when executed by the document processing unit, cause the system to perform:
analyzing a fixed format document to determine a plurality of properties associated with a plurality of paragraphs contained in the fixed format document, wherein the determined plurality of properties include a paragraph property and a character property;

associating each paragraph property and each character property with a discrete value or with a continuous value, wherein the discrete value comprises a numerical value and the continuous value comprises a numerical interval;

determining a dominant character property for each of the plurality of paragraphs based on a most commonly occurring character property discrete value within the respective paragraph;

grouping each of the plurality of paragraphs into clusters according to a common dominant character property;

dividing each cluster of paragraphs into a plurality of sub-clusters of paragraphs, wherein each sub-cluster of paragraphs has a common paragraph property discrete value or a common character property discrete value that is different from the common dominant character property discrete value;

for the paragraphs in each of the plurality of sub-clusters, determining that the paragraphs have a common paragraph property or a common character property associated with a plurality of different intervals of continuous values, and normalizing those plurality of different intervals to a single numerical value;

associating the single numerical value with the common paragraph property or common character property previously associated with the continuous value;

determining a style for each paragraph of the document based on: (a) the dominant common character property discrete value; (b) the common paragraph property discrete value or the common character property discrete value that is different from the dominant common character property discrete value; and (c) the normalized single numerical value of the common paragraph property or common character property that was previously associated with the continuous value; and mapping each paragraph to a flow format document with its determined style.

10. The system of claim 9, wherein determining a dominant character property for each of the plurality of paragraphs based on a most commonly occurring character property discrete value within the respective paragraph includes determining a percentage of common discrete values associated with a common character property associated with each respective paragraph exceeding a predetermined threshold value.

11. The system of claim 9, wherein the paragraph property comprises a paragraph alignment property, a line indentation property, a line spacing property, a paragraph spacing property, paragraph border property or a paragraph shading property.

12. The system of claim 9, wherein the character property comprises a font typeset property, a font color property, a font size property, a font effect property, or a character shading property.

13. The system of claim 12, wherein the font effect property comprises an underline, strikethrough, bold, or italic property.

14. The system of claim 12, wherein the style comprises a Heading style or a Normal style.

15. The system of claim 14, wherein the Normal style comprises the most frequently occurring paragraph style.

16. The system of claim 15, wherein the most frequently occurring paragraph style is determined based on the greatest number of characters associated with a specific paragraph style.

17. A hardware non-transitory computer-readable storage medium encoding computer executable instructions that, when executed by at least one processor, performs a method for converting a fixed format document containing text elements into a flow format document, the method comprising:

analyzing a fixed format document to determine a plurality of properties associated with a plurality of paragraphs contained in the fixed format document, wherein the determined plurality of properties include a paragraph property and a character property;

associating each paragraph property and each character property with a discrete value or with a continuous value, wherein the discrete value comprises a numerical value and the continuous value comprises a numerical interval;

determining a dominant character property for each of the plurality of paragraphs based on a most commonly occurring character property discrete value within the respective paragraph;

grouping each of the plurality of paragraphs into clusters according to a common dominant character property;

dividing each cluster of paragraphs into a plurality of sub-clusters of paragraphs, wherein each sub-cluster of paragraphs has a common paragraph property discrete value or a common character property discrete value that is different from the common dominant character property discrete value;

for the paragraphs in each of the plurality of sub-clusters, determining that the paragraphs have a common paragraph property or a common character property associated with a plurality of different intervals of continuous values, and normalizing those plurality of different intervals to a single numerical value;

associating the single numerical value with the common paragraph property or common character property previously associated with the continuous value;

determining a style for each paragraph of the document based on: (a) the dominant common character property discrete value; (b) the common paragraph property discrete value or the common character property discrete value that is different from the dominant common character property discrete value; and (c) the normalized single numerical value of the common paragraph property or common character property that was previously associated with the continuous value; and mapping each paragraph to a flow format document with its determined style.

18. The hardware non-transitory computer-readable storage medium of claim 17, wherein determining a dominant character property for each of the plurality of paragraphs based on a most commonly occurring character property discrete value within the respective paragraph includes determining a percentage of common discrete values associated with a common character property associated with each respective paragraph exceeding a predetermined threshold value.

19. The hardware non-transitory computer-readable storage medium of claim 17, wherein the paragraph property comprises a paragraph alignment property, a line indentation property, a line spacing property, a paragraph spacing property, paragraph border property or a paragraph shading property.

20. The hardware non-transitory computer-readable storage medium of claim 17, wherein the character property comprises a font typeset property, a font color property, a font size property, a font effect property, or a character shading property.

21. The hardware non-transitory computer-readable storage medium of claim 20, wherein the font effect property comprises an underline, strikethrough, bold, or italic property.

22. The hardware non-transitory computer-readable storage medium of claim 20, wherein the style comprises a Heading style or a Normal style.

23. The hardware non-transitory computer-readable storage medium of claim 22, wherein the Normal style comprises the most frequently occurring paragraph style.

24. The hardware non-transitory computer-readable storage medium of claim 23, wherein the most frequently occurring paragraph style is determined based on the greatest number of characters associated with a specific paragraph style.

* * * * *